Figure 1:
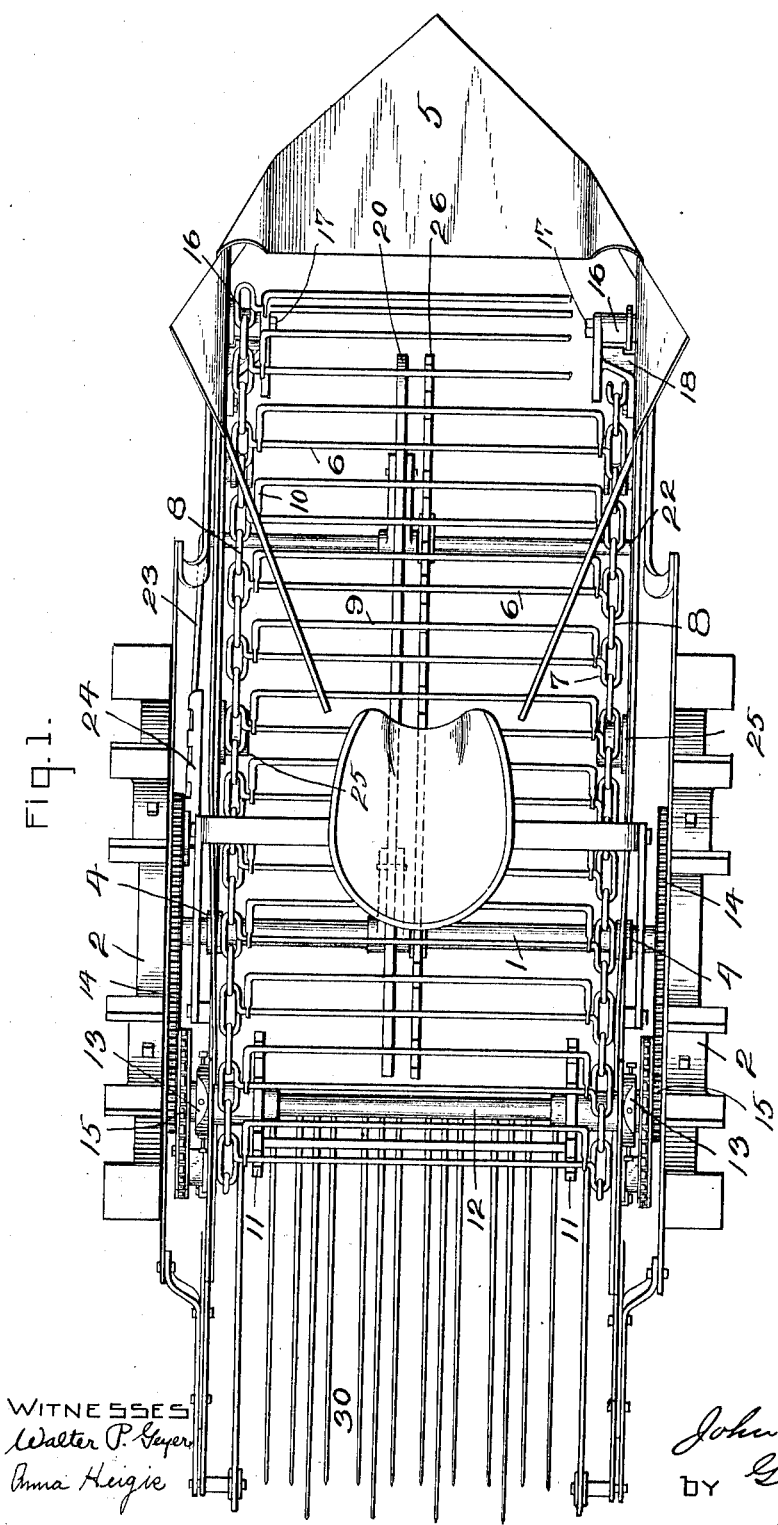

J. REUTHER.
POTATO SEPARATOR.
APPLICATION FILED JAN. 23, 1913.

1,061,568.

Patented May 13, 1913.
2 SHEETS—SHEET 1.

WITNESSES
Walter P. Geyer
Anna Heigie

INVENTOR
John Reuther,
by Geyer Popp
ATTORNEYS

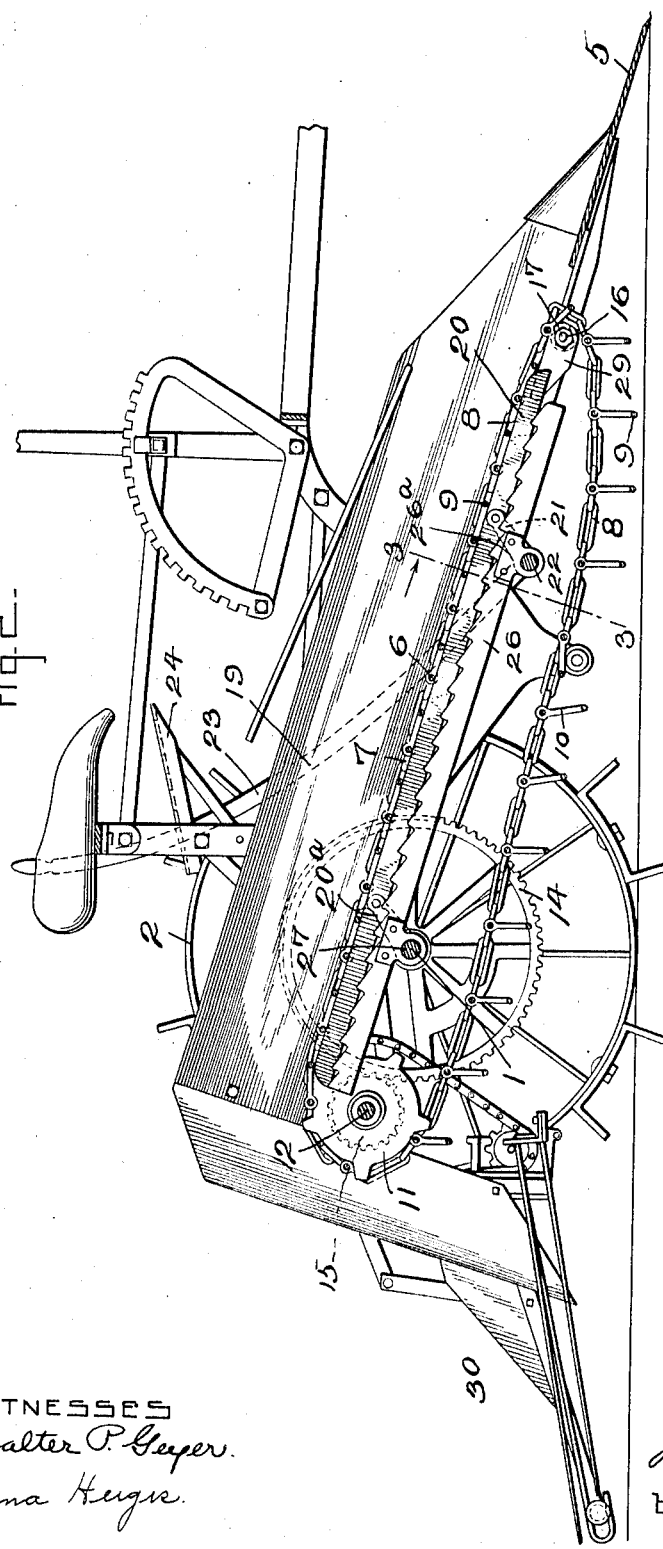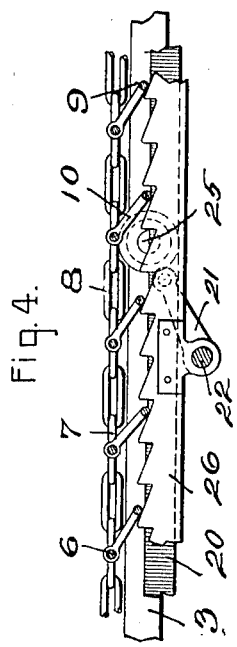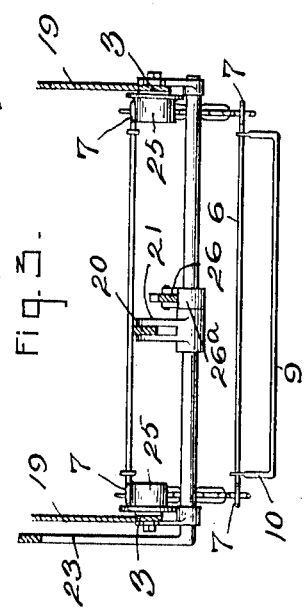

UNITED STATES PATENT OFFICE.

JOHN REUTHER, OF EAST AURORA, NEW YORK.

POTATO-SEPARATOR.

1,061,568.  Specification of Letters Patent.  Patented May 13, 1913.

Application filed January 23, 1913. Serial No. 743,741.

*To all whom it may concern:*

Be it known that I, JOHN REUTHER, a citizen of the United States, residing at East Aurora, in the county of Erie and State of New York, have invented new and useful Improvements in Potato-Separators, of which the following is a specification.

This invention relates to potato diggers of the type having an elevator or separator composed of endless chains and transverse rods connected therewith. Separators of this kind are shown and described in Letters Patent of the United States Nos. 922,816 and 967,557, granted to me May 25, 1909 and August 16, 1910, respectively.

One object of the present invention is to improve the construction of the endless elevator or separator with a view of rendering the distance between its rods variable or adjustable to suit different soils, wet or sticky soil requiring a wider spacing of the rods than dry or hard soil.

A further object is to simplify the construction of the separator in order to reduce its cost and facilitate the assemblage of its parts.

In the accompanying drawings: Figure 1 is a top plan view of the machine, partly in section. Fig. 2 is a vertical longitudinal section of the machine, the usual draft pole and truck being omitted. Fig. 3 is a transverse section thereof, on line 3—3, Fig. 2. Fig. 4 is an enlarged fragmentary longitudinal section of the separator showing the agitator in operation.

Similar characters of reference indicate corresponding parts throughout the several views.

1 indicates the main axle of the machine on which the ground wheels 2 are mounted in the customary manner. Supported on this axle is the main frame having forwardly inclined side bars 3. As shown in Fig. 1, the axle is mounted in bearings 4 secured to these side bars.

5 indicates the digging device of the machine which preferably consists of a plow or pointed blade suitably secured to the front ends of the side bars 3.

The elevator or separator is arranged immediately behind the plow 5 to receive the potatoes, soil and weeds therefrom, as in the Letters Patent hereinbefore referred to. It consists of a plurality of transverse rods or bars 6 extending across the machine and preferably having their outer ends formed with integral chain-links 7 which are connected together by separate links 8, thereby forming on either side of the machine endless chains or carriers. By thus providing the rods 6 with integral chain links, the construction of the separator is materially simplified and reduced in cost, and the assemblage of its parts is also facilitated. Alternating with the transverse rods 6 are similar separating rods 9 which are provided at their ends with crank arms 10 pivoted to one of the first mentioned rods. These two sets of rods are properly spaced to intercept potatoes, while allowing the detached soil to fall between them. The rods 6 and 9 are adapted to engage the teeth of a pair of actuating or sprocket wheels 11 secured to a transverse shaft 12 supported in bearings 13 mounted on the rear portions of the side bars 3, whereby the rear portions of the endless chains are carried by said sprocket wheels. As shown in the drawings, these wheels are arranged on the inner side of the chains. The sprocket shaft 12 is driven from the axle 1 by gear wheels 14 and pinions 15 which latter are shown in dotted lines in Fig. 2. The front portions of the endless chains preferably run around smooth guide rollers or pulleys 16 journaled on studs 17 carried by the side-bars 3, as shown in Figs. 1 and 2. The inner ends of these studs are preferably carried by brackets 18 secured to the inner sides of said side bars.

19 indicates the stationary side walls of the separator which are bolted or otherwise secured to the side bars 3.

The machine is provided with a longitudinal bar or rail 20 arranged underneath the upper portion of the separator and adapted to adjust the swinging rods toward and from the non-adjustable rods. This rail is vertically adjustable and carried at its rear end by a link 20ᵃ pivoted upon the axle 1, and near its front end by an arm 21 secured to a transverse rock shaft 22 carried by the frame bars 3 and having a lever 23 for turning it. This lever may be locked in position by engaging a fixed toothed bar 24, or other suitable means. While traveling along the upper side of the separator, the bodies of the swinging rods ride upon and are supported by the rail 20, and for this purpose this rail extends nearly throughout the length of the separator, as shown.

As clearly shown in Fig. 3, the outer ends of the straight separator rods 6 are supported at suitable intervals by flanged rollers 25 mounted on the main frame. These rollers however do not extend inwardly far enough to support or interfere with the movements of the swinging rods 9.

It will now be seen that upon raising or lowering the swinging rods 9 by means of the adjusting rail 20, they approach or recede from the adjacent non-adjustable rods 6, thereby increasing or decreasing the spaces between the alternating swinging and non-adjustable rods accordingly. For digging in dry or hard soil, which requires a comparatively narrow spacing of the separator rods, the swinging rods are elevated to the general plane or level of the non-adjustable rods, as shown in Figs. 1 and 2, while in digging in wet or sticky soil which requires a wider spacing of the rods, the swinging rods are lowered more or less, as shown in Fig. 4. A suitable agitator is preferably employed for shaking the swinging rods when in the last-mentioned position, in order to effectually break up and detach the soil from the rods. The agitator shown in the drawings consists of a notched or rack bar 26 arranged beside the adjusting bar 20 and secured near its lower end to a bearing 26ª mounted upon the transverse rock shaft 22 and supported near its rear end by a similar bearing 27 mounted on the axle 1.

The brackets 18 are arranged on the rear sides of the rollers 16 between the upper and lower portions of the carriers and are preferably provided with rearwardly extending supports or guides 29 arranged to direct the rods 6 and 8 on to the adjusting rail 20 or the agitating device 26, to prevent blocking of the separator. Upon passing around the rear sides of the sprocket wheels 11 the swinging separator rods 9 are free to drop into a pendent position, thereby further increasing the space between the rods while on the underside of the separator and discharging any earth and stones therefrom.

30 indicates a shaker or final separator arranged to receive the material from the tail of the endless main separator or elevator. This shaker forms no part of the present invention and may be of any suitable construction.

I claim as my invention:

1. In a potato digger, the combination of a separator comprising endless carriers and transverse separating rods, alternate rods being adjustable relatively to the remaining rods to vary the space between them, and means for delivering the material upon the separator.

2. In a potato digger, the combination of a separator comprising endless carriers and transverse separating rods, alternate rods being immovable relatively to the carriers and the remaining rods being pivoted to swing toward and from the immovable rods to vary the space between the immovable and the swinging rods, means for limiting the pivotal movement of the swinging rods, and means for delivering the material upon the separator.

3. In a potato digger, the combination of a separator comprising endless carriers and transverse separating rods, alternate rods being immovable relatively to the carriers and the remaining rods being pivoted on the first-named rods to swing vertically thereon, means for adjusting said swinging rods, and means for delivering the material upon the separator.

4. In a potato digger, the combination of a separator, comprising endless carriers and transverse separating rods, alternate rods being substantially straight throughout their length and attached to said carriers, and each of the intermediate rods having crank arms pivoted to one of said straight rods, means for limiting the swinging movement of said pivoted rods, and means for delivering the material upon the separator.

5. In a potato digger, the combination of a separator comprising endless carriers and transverse separating rods, alternate rods being attached to the carriers, the intermediate rods being pivoted to the first-named rods to swing vertically thereon, means underneath the upper portion of the separator for supporting said swinging rods at different distances from the plane of said first-named rods, and means for delivering the material upon the separator.

6. In a potato digger, the combination of a separator comprising endless carriers and transverse separating rods, alternate rods being immovable relatively to the carriers and the remaining rods being pivoted on the first-named rods to swing vertically thereon, a supporting rail for said swinging rods arranged lengthwise underneath the upper portion of the carriers, means for adjusting said rail toward and from the upper portion of the separator, and means for delivering the material upon the separator.

7. In a potato digger, the combination of a separator comprising endless carriers and transverse separating rods, alternate rods being attached to said carriers, the intermediate rods each having crank-arms pivoted on one of the first-named rods, an adjustable rail for moving said pivoted rods toward and from the plane of the other rods, an agitator arranged to engage said pivoted rods when lowered below the plane of the other rods, and means for delivering the material upon the separator.

8. In a potato digger, the combination of a separator, comprising endless chains and transverse separating rods, the ends of alternate rods being integral with a pair of links of said chains, each of the intermediate rods being pivoted to one of the first-mentioned rods, means for limiting the swinging movement of said pivoted rods, and means for delivering the material upon the separator.

9. In a potato digger, the combination of a separator comprising transverse separating rods provided at their ends with integral chain links, separate chain links uniting the first-mentioned links and forming endless carriers therewith, and a second set of separating rods alternating with said link-rods and each having crank arms pivoted to one of the link-rods to swing vertically thereon, means for adjusting said swinging rods, and means for delivering the material upon the separator.

Witness my hand this 21st day of January, 1913.

JOHN REUTHER.

Witnesses:
C. F. GEYER,
E. M. GRAHAM.

Copies of this patent may be obtained for five cents each, by addressing the "Commissioner of Patents, Washington, D. C."